United States Patent [19]

Fraser

[11] Patent Number: 5,729,252
[45] Date of Patent: Mar. 17, 1998

[54] MULTIMEDIA PROGRAM EDITING SYSTEM AND METHOD

[75] Inventor: Alexander Gibson Fraser, Bernardsville, N.J.

[73] Assignee: Lucent Technologies, Inc., Murray Hill, N.J.

[21] Appl. No.: 807,945

[22] Filed: Feb. 28, 1997

Related U.S. Application Data

[63] Continuation of Ser. No. 364,629, Dec. 27, 1994, abandoned.

[51] Int. Cl.⁶ ................................................ G06T 1/00
[52] U.S. Cl. ........................ 345/302; 382/306; 358/479; 235/470; 345/328
[58] Field of Search ...................... 395/806, 807, 395/792, 762, 327, 328; 348/7, 461; 382/306; 345/156, 179; 235/470, 471, 462; 358/474, 479

[56] References Cited

U.S. PATENT DOCUMENTS

| | | | |
|---|---|---|---|
| 4,992,649 | 2/1991 | Mampe et al. | 235/462 |
| 5,093,873 | 3/1992 | Takahashi | 382/306 |
| 5,262,860 | 11/1993 | Fitzpatrick et al. | 348/461 |
| 5,353,392 | 10/1994 | Luquet et al. | 395/135 |
| 5,434,403 | 7/1995 | Amir et al. | 235/472 |
| 5,440,678 | 8/1995 | Eisen et al. | 395/154 |
| 5,511,148 | 4/1996 | Wellner | 395/106 |
| 5,528,263 | 6/1996 | Platzker et al. | 345/156 |
| 5,535,063 | 7/1996 | Lamming | 360/4 |

FOREIGN PATENT DOCUMENTS

| | | | |
|---|---|---|---|
| 0410579 | 6/1990 | European Pat. Off. | G11B 27/10 |
| 0206565 | 12/1986 | United Kingdom. | |
| WO 95/34881 | 12/1995 | WIPO | G09G 5/08 |

*Primary Examiner*—Joseph H. Feild

[57] ABSTRACT

A system and method for interposing stored images to moving video within multimedia computer programs, wherein the system recognizes specific identifiers upon an object or image that identify that the object or image is a visual aid to be incorporated into the multimedia program. In response to this recognition, a previously stored image associated with the identified object/image is retrieved and inserted into the multimedia computer program.

18 Claims, 2 Drawing Sheets

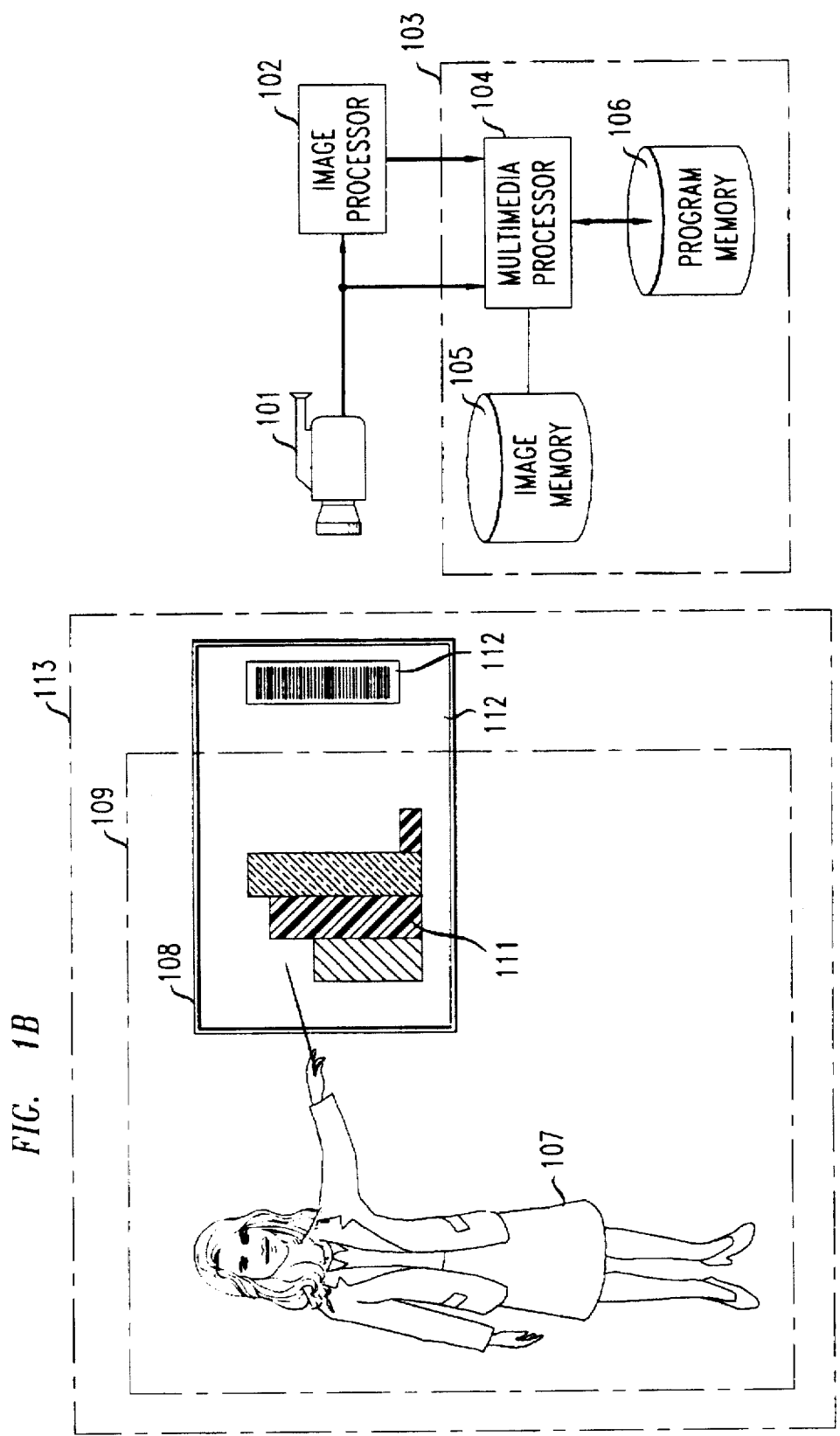

MULTIMEDIA PROGRAM EDITING SYSTEM AND METHOD

This is a Continuation of application Ser. No. 08/364,629 filed Dec. 27, 1994, now abandoned.

TECHNICAL FIELD

The invention relates to multimedia programming and more particularly, to improving the production of multimedia computer programs.

BACKGROUND OF THE INVENTION

With more powerful computing systems becoming commonplace in homes, schools and offices, and the continuing improvements in data network connectivity (the so-called "information highway"), interactive multimedia programming is becoming an increasingly important area of computer software. One of the primary applications of multimedia programming in any of these environments is to provide users with an interactive, and hopefully enhanced learning experience. In particular, multimedia has been employed to facilitate distance learning—Allowing many users to view lectures, tutorials and other presentations at their own individual pace and in a format that integrates moving and still video images with an audio track. One typical format for such educational multimedia programs is to provide a user with a moving video image and synchronized audio track of a lecturer or tutor, and at selected points during the program augment the moving video with a video still of a photograph, diagram, illustration or other visual aid related to the subject matter being discussed. For example, if a multimedia program provided a user with a moving video image of an individual delivering a lecture in an auditorium, and that individual began referring to a photographic slide projected onto a viewing screen in that auditorium, the multimedia program would concurrently provide a user with a still image of that projected photographic slide. Generally, this still image provides the user of the multimedia program with a clearer image of the visual aid than the one captured by the camera being employed to record the individual lecturing. Presently, programming such a multimedia offering requires a post-production effort that includes viewing a videotape of the lecture and editing the videotape by interposing the proper frames of video that will be associated with a particular still image.

SUMMARY OF THE INVENTION

The present invention overcomes the deficiencies and inconvenience of prior techniques for interposing images to moving video within multimedia computer programs by employing a system that recognizes specific identifiers upon an object indicating that the object is a visual aid to be incorporated into a multimedia computer program. In response to this recognition, a previously stored image associated with the identified object/image is retrieved and inserted into the multimedia computer program.

BRIEF DESCRIPTION OF THE DRAWING

In the drawing:

FIG. 1B is a simplified block diagram of the arrangement of FIG. 1A including an image of a projected visual aid.

DETAILED DESCRIPTION OF THE INVENTION

Figure 1A:
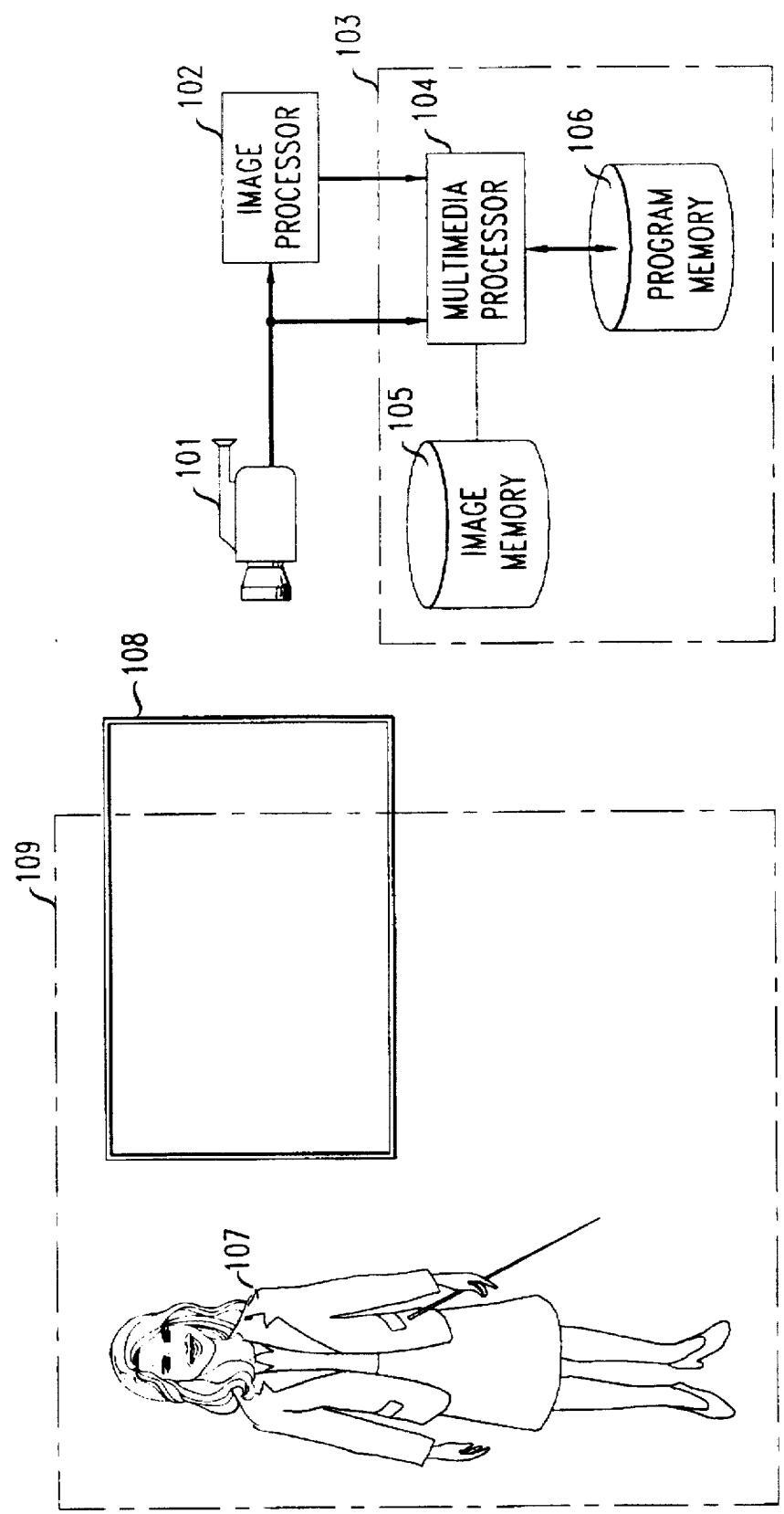
FIG. 1A is a simplified block diagram of an exemplary arrangement facilitating the practice of the invention.

FIG. 1A is a simplified block diagram of an exemplary multimedia system facilitating the practice of the invention.

As shown, the system includes video camera 101, image processor 102, and multimedia computer 103. Multimedia computer 103 includes multimedia processor 104, image memory 105, and program memory 106. Image processor 102 is a digital processor adapted to detect and recognize video signals representing bar code images. The use of bar codes and image processors adapted to recognize such visual codes are well known in the art. In this particular example of the operation of the system of FIG. 1A, video camera 101 is directed to capture moving images of an individual (107) making a presentation, and a projection screen (108, shown to be blank) that is employed to display a set of visual aids throughout the presentation. The signals representing the captured images are passed to image processor 102 and multimedia processor 104.

Prior to beginning the process of capturing images of the presentation, a digital image of each visual aid that will be shown upon projection screen 108 is stored within image memory 105. Each stored image is indexed with a particular identifying code enabling multimedia processor 103 to selectively retrieve the data representing an image according to its associated identifying code. The digital images of the visual aids may be obtained by optical scanning, capturing a high-resolution image with a video camera, directly importing files representing computer-generated graphics, or through any other of a number of well-known methods.

As indicated by dotted-line box 109, the lens of video camera 101 is adjusted to capture the image of individual 107 and a portion of projection screen 108. As individual 107 makes the presentation, the video signal from camera 101 is processed by multimedia computer 103 (typical video processing involves compression of the video signal) and stored within program memory 106. Storing signals representing live video upon a program memory within a multimedia computer is common in the art. Simultaneously, the video signal from camera 101 is received and processed by image processor 102, which examines the received signal to detect bar code images. However, as the image being captured by video camera 101 does not include a bar code image, there is no response to the image by image processor 102, and multimedia computer 103 continues to compile a digital record of the presentation within program memory 105.

As the presentation being made by individual 107 progresses, an image (110) is projected upon projection screen 108 (see FIG. 1B). This projection is performed independently of the multimedia system shown in FIGS. 1A and 1B, and has no effect on the recording of the presentation being compiled upon program memory 106. Projected image 110 includes an image of a bar graph (111) that will serve as a visual aid during the presentation, and an image of bar code 112 (representing an identifier code associated with the projected image). As shown in FIG. 1B, the initial image being captured by video camera 101 (indicated by dotted line box 109) is not inclusive of the projected bar code region. If, however, the field of view of video camera 101 is adjusted (as indicated by dotted-line box 113) to encompass projected bar code 112, image processor 102 detects and recognizes the pattern of bar code 112 within the signal received from camera 101. In response, data indicative of this detection and recognition is transmitted from image processor 102 to multimedia processor 104. Upon receipt of this data, multimedia processor 104 retrieves from image memory 105 a previously stored image corresponding to the recognized identifier code. This retrieved image is then inserted into the digital record of the presentation being compiled by multimedia processor 104 in lieu of the images directly received from video camera 101 by multimedia processor 104. As long as video camera 101 continues to provide image processor 102 with a video signal that includes a recognizable representation of bar code 112, the image recorded upon program memory 106 will be that of the retrieved image associated with that bar code. When and if video camera 101 fails to capture the image of bar code 112, the signal indicative of bar code detection and recognition will cease to be transmitted from image processor 102 to multimedia processor 104, and the images being directly received from video camera 101 will again be recorded upon program memory 106. It will be obvious that as different images that include a bar codes representing identifier codes associated with images stored in image memory 105 are projected within the field of view of video camera 101, each associated image will be retrieved and inserted into the digital record being compiled within multimedia computer 103.

The above described system and method provides a simple means by which a multimedia record of a live event can be augmented with high-quality images of visual aids. It will be understood that the particular techniques described above are only illustrative of the principles of the present invention, and that various modifications could be made by those skilled in the art without departing from the scope and spirit of the present invention, which is limited only by the claims that follow. For example, the particular aspect or feature of a visual aid that is detected and recognized by the image processor need not be a bar code. Image processors capable of recognizing specific text, patterns, shapes, colors, and/or a combination of these image attributes can be employed—Such processors are well known in the art. In addition, the invention could be modified to substitute a retrieved image into the multimedia record being for a fixed interval following the initial detection and recognition of the particular image identifier (as opposed to an image substitution which has a duration equal to the period of time the particular identifier is visible to the video camera). One other modification of the invention would be employing the system and method to conduct a live transmission of a presentation or event. In such a live application, the output of the multimedia processor would be transmitted to remote locations for immediate viewing (as opposed to simply being stored in a program memory for subsequent viewing). Yet another modification would include retrieving full motion video sequences in response to detecting and recognizing an image identifier, and substituting the retrieved video sequences for the live video being captured by a video camera.

I claim:

1. A method for editing a multimedia program, comprising the steps:

presenting individual ones of a plurality of presented images with each of the presented images being associated with a particular identifier code;

storing within a memory a plurality of high-resolution images corresponding to respective ones of said plurality of presented images and the particular identifier code associated therewith;

monitoring a video signal to detect a signal corresponding to a pattern representing one of said particular identifier codes;

retrieving from said memory, in response to detection of a signal corresponding to a pattern representing a particular identifier code, one or more high-resolution images associated with said particular identifier code;

interposing the one or more high-resolution images associated with said particular identifier code into the multimedia program; and recording the multimedia program with the one or more interposed high-resolution images while excluding the one or more corresponding presented images in the recorded multimedia program.

2. The method of claim 1 wherein said image represents moving images.

3. The method of claim 1 wherein said pattern representing one of said particular identifier codes is a bar code image.

4. The method of claim 1 wherein said pattern representing one of said particular identifier codes is text.

5. The method of claim 1 wherein said pattern representing one of said particular identifier codes is a particular geometric shape.

6. A system for editing a multimedia program, comprising:

a plurality of presented images, each presented image being associated with a particular identifier code;

an image memory containing a plurality of high-resolution images, each of said high-resolution images corresponding to each of the presented images and being associated with respective ones of the particular identifier codes of the presented images;

an image processor adapted to detect at least one of said particular identifier codes of the presented images;

a processor adapted to retrieve from said image memory, in response to the detection by said image processor of said particular identifier code, one or more high-resolution images associated with a corresponding one of said particular identifier codes represented by said detected particular identifier code and to interpose one or more high-resolution images into the multimedia program; and a recorder for recording the multimedia program with one or more high-resolution images interposed therein in lieu of one or more corresponding presented images.

7. The invention of claim 6 wherein said image representing one of said particular identifier codes is a bar code image.

8. The invention of claim 6 wherein said image representing one of said particular identifier codes is text.

9. The invention of claim 6 wherein said image representing one of said particular identifier codes is a particular geometric shape.

10. A system for editing a multimedia program, comprising:

a video camera adapted to produce signals indicative of captured image, including particular images representing particular identifier codes;

an image memory containing a plurality of high-resolution images, each of said high-resolution images being associated with a particular identifier code;

an image processor adapted to receive said indicative signals from said video camera and detect signals indicative of the particular image associated with one of said particular identifier codes;

a processor adapted to retrieve from said image memory, in response to the detection by said image processor of signals indicative of the particular image having a pattern representing a particular code, one or more high-resolution images associated with said particular identifier code represented by said detected image; and a recorder for recording the multimedia program with one or more high-resolution images interposed in the recorded multimedia program.

11. The invention of claim 10 wherein said images captured by said video camera are moving images.

12. The invention of claim 10 wherein said image representing one of said particular identifier codes is a bar code image.

13. The invention of claim 10 wherein said image representing one of said particular identifier codes is text.

14. The invention of claim 10 wherein said image representing one of said particular identifier codes is a particular geometric shape.

15. A method of editing an audiovisual transmission, comprising the steps of:

presenting a plurality of presented images including at least one coded presented image and a plurality of non-coded presented images, the at least one coded presented image being associated with a particular identifier code;

storing at least one high-resolution image in a computer memory;

associating the at least one high-resolution image with the particular identifier code;

monitoring the presentation of the plurality of presented images to detect a signal corresponding to the particular identifier code;

retrieving from the computer memory, when detecting the signal corresponding to the particular identifier code, the at least one high-resolution image associated with the particular identifier code;

interposing the at least one high-resolution image into the audiovisual transmission when the signal corresponding to the particular identifier code is detected while simultaneously excluding the coded presented image from the audiovisual transmission; and broadcasting the audiovisual transmission comprising the plurality of non-coded presented images and the at least one high-resolution image.

16. A method according to claim 15, further comprising the step of retaining the interposed high resolution image into the audiovisual transmission for a fixed interval of time.

17. A method according to claim 15, further comprising the step of retaining the interposed high resolution image into the audiovisual transmission for as long as the signal corresponding to the particular identifier code is detected.

18. A method according to claim 15, wherein said at least one high resolution image is one of a still image and a sequence of moving video images.

* * * * *